United States Patent
Hirabayashi et al.

(10) Patent No.: US 6,268,426 B1
(45) Date of Patent: Jul. 31, 2001

(54) CONDUCTIVE FLUOROSILICONE RUBBER COMPOSITION

(75) Inventors: Satao Hirabayashi, Takasaki; Tsutomu Nakamura, Annaka, both of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/531,271

(22) Filed: Mar. 20, 2000

(30) Foreign Application Priority Data

Mar. 24, 1999 (JP) .................................................. 11-078869

(51) Int. Cl.⁷ ....................................................... C08K 3/03
(52) U.S. Cl. ............................................ 524/495; 524/496
(58) Field of Search ...................................... 524/495, 496

(56) References Cited

U.S. PATENT DOCUMENTS 4,491,536 * 1/1985 Tomoda et al. ....................... 252/512
5,837,340 * 11/1998 Law et al. ............................ 428/36.8
6,133,373 * 10/2000 Kirochko et al. ..................... 524/805

\* cited by examiner

*Primary Examiner*—Edward J. Cain
(74) *Attorney, Agent, or Firm*—Pillsbury Winthrop LLP

(57) ABSTRACT

A conductive fluorosilicone composition including: (A) an organopolysiloxane having a polymerization degree of at least 100 and represented by the following average compositional formula:

$$R_a(CF_3CH_2CH_2)_b SiO_{[4-(a+b)]/2} \quad (1)$$

wherein R is an unsubstituted monovalent hydrocarbon group, a is a number ranging from 0.8 to 1.8, b is a number ranging from 0.2 to 1.2, and a and b are numbers satisfying $a+b=1.95$ to 2.05 and $b/(a+b)=0.1$ to 0.6, (B) a graphitization-treated carbon black, and (C) a curing agent. The composition can give, upon curing, a cured product having a small tension-set, a good rubber-elasticity and an excellent heat-resistance, as well as a desired conductivity and a good solvent-resistance.

9 Claims, No Drawings

CONDUCTIVE FLUOROSILICONE RUBBER COMPOSITION

BACKGROUND OF THE INVENTION

1. Field of the Invention

The present invention relates to a conductive fluorosilicone rubber composition providing a conductive fluorosilicone rubber which is particularly small in tension set, rich in rubber elasticity, and excellent in heat resistance.

2. Description of the Prior Art

Conductive elastomers are broadly used in, for example, rubber contacts, static electricity, removal of electricity, shield of electromagnetic waves, and materials for various conductive rolls. As raw materials of the conductive elastomers, there are used various materials such as silicone, polyurethane, polyethylene, polypropylene and natural rubbers, depending on properties such as rubber strength, abrasion, and fire retardance which are required in accordance with the purposes of the conductive elastomers to be used.

As methods for rendering electrical conductivity to elastomers, there are used an electron transfer type in which a conductive carbon or a conductive metal powder is mixed, and an ion conductive type in which an ion conductive agent such as a lithium ion conductive agent is mixed. Generally speaking, the electron transfer type is broadly used.

Among the conductive elastomers, the conductive silicone rubber is excellent in properties such as heat resistance, cold resistance, and weatherability, so that it is used in rubber contacts and materials for business machines. Especially, a fluorosilicone rubber having a 3,3,3-trifluoropropyl group at its side chain is excellent in not only the above properties but also solvent resistance. There is a defect that addition of carbon to the fluorosilicone rubber for providing the same with electric conductivity results in lowering of mechanical strength and rubber elasticity. Particularly, the rubber elasticity typically represented by tension set is extremely lowered and heat deterioration is increased, so that there occurs a problem in use as diaphragms, O-rings or oil seal materials, which are typical parts of the fluorosilicone rubber, as parts of transportation or parts of petroleum-related apparatus and instrument.

In the case of the ion conductive fluorosilicone rubber, it is required to add a large amount of a transmitting substance (binder) for the ion conductive agent to the fluorosilicone rubber. This causes hindrance in crosslinking of the rubber material and decrease in the mechanical strength of a cured rubber. Thus, any practical product has not been known yet.

SUMMARY OF THE INVENTION

Accordingly, an object of the present invention is to provide a conductive fluorosilicone rubber composition which upon curing, forms a conductive fluorosilicone rubber small in tension set, rich in rubber elasticity, and excellent in heat resistance.

Earnest studies have been made in order to accomplish the above object, and as a result, it has been found that the above object can be accomplished by using a graphitization-treated carbon black as a conductive carbon.

Thus, the present invention provides a conductive fluorosilicone composition comprising:

(A) An organopolysiloxane having a polymerization degree of at least 100 and represented by the following average compositional formula:

$$R_a(CF_3CH_2CH_2)_b SiO_{[4-(a+b)]/2} \quad (1)$$

wherein R is an unsubstituted monovalent hydrocarbon group, a is a number ranging from 0.8 to 1.8, b is a number ranging from 0.2 to 1.2, and a and b are numbers satisfying a+b=1.95 to 2.05 and b/(a+b)=0.1 to 0.6, (B) a graphitization-treated carbon black, and (C) a curing agent.

DETAILED DESCRIPTION OF THE PREFERRED EMBODIMENTS

The present invention will be described in more detail below.

[(A) Organopolysiloxane]

The organopolysiloxane used as component (A) in the present invention is represented by the following average compositional formula (1):

$$R_a(CF_3CH_2CH_2)_b SiO_{[4-(a+b)]/2} \quad (1)$$

wherein R is an unsubstituted monovalent hydrocarbon group, a is a number ranging from 0.8 to 1.8, b is a number ranging from 0.2 to 1.2, and a and b are a numbers satisfying a+b=1.95 to 2.05 and b/(a+b)=0.1 to 0.6.

The unsubstituted monovalent hydrocarbon group R includes, for example, an alkyl group such as a methyl group, an ethyl group, a propyl group and a butyl group; an alkenyl group such as a vinyl group, an allyl group and a butenyl group; a cycloalkyl group such as a cyclohexyl group; an aryl group such as a phenyl group, a tolyl group and a naphthyl group; an aralkyl group such as a benzyl group and a 2-phenylethyl group. Preferred are a methyl group and a vinyl group. Preferably, an alkenyl group, such as a vinyl group is contained in an amount of 0.01 to 2 mole %. Where a plurality of the R's are present in the molecule, they may be the same or different.

The a which represents the proportion of the group R is a number ranging from 0.8 to 1.8, the b which represents the proportion of the 3,3,3-trifluoropropyl group $(CF_3CH_2CH_2—)$ is a number ranging from 0.2 to 1.2, and the a+b which represents the total of both ranges from 1.95 to 2.05. Further, the ratio of the 3,3,3-trifluoropropyl group to the total of both, b/a+b, ranges from 0.1 to 0.6, preferably from 0.2 to 0.6.

Although it is basically preferred that the molecular structure of the organopolysiloxane represented by the above formula (1) is linear, a part of the molecular structure may be branched. The structure may be formed of only a repeating unit represented by

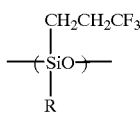

wherein R is as defined in respect of the formula (1), or may be formed of a blockpolymer comprising a repeating unit represented by

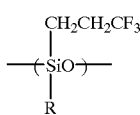

wherein R is as defined in respect of the formula (1), and a repeating unit represented by

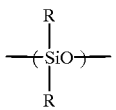

wherein R is as defined in respect of the formula (1).

The terminal end is preferably blocked with

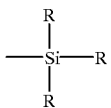

wherein R is as defined in respect of the formula (1), or

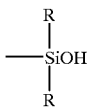

wherein R is as defined in respect of the formula (1).

The polymerization degree is preferably 100 to 20,000, more preferably 1,000 to 10,000, because a good processability is obtained.

[Graphitization-treated carbon black]

In the present invention, the graphitization-treated carbon black is used as component (B). The graphitization-treated carbon black is obtained by treating a carbon black at a high temperature until the carbon black has a graphite structure. Particularly, preferred is a graphitization-treated carbon black having an average particle diameter of 200 nm or less which has been obtained by subjecting a carbon black such as the furnace black or the thermal black which are originally manufactured by combustion to heat-treatment at 1,500 to 4,000° C. Particularly preferred is a graphitization-treated carbon black containing a volatile matter in an amount of 0.6% by weight or less. Herein, the volatile matter is measured according to JIS K-6221-1982 (Testing method for carbon black for rubbers).

Carbon blacks are manufactured by various manufacturing processes which are known as, for example, the contact process, the furnace process or the thermal process. Typical carbon blacks include furnace black, acetylene black, ketjen black, channel black and so on. However, when the carbon black thus obtained is used as it is, the resulting cured fluorosilicone rubber is lowered in rubber elasticity and heat resistance as well as mechanical strength represented by tension set. This is presumably because a trifluoropropyl group-containing organopolysiloxane is slow in crosslinking compared to methylvinylpolysiloxanes conventionally used, and in addition because reactive ingredients, such as a carboxyl group, a lactone, a phenol, a quinone or an active hydrogen, present on, for example, the surface of the carbon black inhibits crosslinking of the organopolysiloxane.

In the present invention, the graphitization-treated carbon black is used to remove the inhibitory for crosslinking.

The graphitization treatment presumably promotes the growth (graphitization) of crystallites of carbon black and the decomposition and removal of the reactive ingredients present on the surface.

The temperature of the heat treatment of carbon black is preferably 1,500 to 4,000° C., and more preferably 2,000 to 3,000° C. At less than 1,500° C., the reactive ingredients may not be sufficiently removed, while at more than 4,000° C., it may be difficult to stably manufacture a graphitized carbon black.

The average particle diameter of the graphitization-treated carbon black is preferably 200 nm or less, and more preferably 1 to 100 nm. When the particle diameter is more than 200 nm, the conductivity of the graphitization-treated carbon black may be low and thus required to be added in a large amount. When it is added in a large amount, the elastomer obtained by curing the composition may be too hard or have a poor mechanical strength.

The amount of volatile matter, which is an index of impurities contained in the graphitization-treated carbon black, is preferably 0.6% by weight or less, and more preferably 0.4% by weight or less.

The graphitization-treated carbon black used as component (B) in the present invention can be obtained by subjecting conventionally used carbon black to the heat treatment described above. Carbon black used as a starting material is not particularly limited, but is preferably ones manufactured by the combustion processes. Particularly, the carbon blacks produced by the furnace process or the thermal process, are more advantageous in view of the removability of the reactive ingredients.

The graphitization-treated carbon black which may be used as the component (B) of the present invention includes, for example, a graphitization-treated carbon black commercially available from Mitsubishi Kagaku K.K. under the tradename of #4350B (average particle diameter: 40 nm, DBP oil take-up: 171 ml/100 g, volatile matter: 0.3%) and #4000B (average particle diameter: 20 nm, DBP oil take-up: 80 ml/100 g, volatile matter: 0.3%).

The amount of the graphitization-treated carbon black, the component (B) of the present invention, is determined depending on the electrical resistance of a material to be produced and, in view of the processability of the resulting composition and the conductivity of the resulting elastomer, is in the range of 1 to 100 parts by weight, and preferably 3 to 50 parts by weight, based on 100 parts by weight of the organopolysiloxane, component (A).

The graphitization-treated carbon black may be used singly or in combination of two or more thereof.

[(C) Curing agent]

As component (C) in the present invention, the curing agent can be appropriately selected so as to be suited for the method of curing the composition. For example, organic peroxides are used in organic peroxide-crosslinking, and a combination of an organohydrogenpolysiloxane with a platinum catalyst is used in addition-crosslinking. In the present invention, it is desirable to use the organic peroxides.

The organic peroxide catalysts include, for example, 2,4-dicumyl peroxide, 2,5-dimethyl-bis(2,5 -t-butylperoxy) hexane, di-t-butyl peroxide and t-butyl perbenzoate. They can be used singly or in a combination of two or more thereof. The amount of the organic peroxide catalyst to be added is preferably 0.1 to 5 parts by weight, based on 100 parts by weight of component (A).

Addition-crosslinking can be used when the organopolysiloxane of component (A) has at least two alkenyl groups. In this case, preferably the organohydrogenpolysiloxane is used in such an amount that the -SiH group of the organohydrogenpolysiloxane is present in an amount of 0.5 to 5 equivalent weight per equivalent weight of alkenyl groups contained in the organopolysiloxane of component (A). Also in this case, preferably the platinum catalyst is used in an amount of 1 to 2,000 ppm.

[Other components]

Other components may be optionally added in the composition of the present invention.

Finely powdered silica filler

The finely powdered silica filler is added for the purpose of reinforcing the silicone rubber, increasing viscositiy, improving processability, extending, etc. Specifically, the silica filler is exemplified by fumed (dry-process) silica produced by reacting $SiCl_4$ with steam; wet-process silica produced by neutralizing water glass, which is sodium silicate, with an acid; hydrophobic-treated silicas obtained by hydrophobic-treating the surfaces of dry-process silicas or wet-process silicas; finely powdered quartz; diatomaceous earth, etc. Particulary, there are used those having a specific surface area of preferably not less than 1 $m^2/g$, more preferably 30 to 500 $m^2/g$, and still more preferably 100 to 400 $m^2/g$.

These finely powdered silica fillers are used singly or in combination of two or more thereof. The amount of the silica filler is generally 0 to 500 parts by weight, and preferably 10 to 300 parts by weight, per 100 parts by weight of the fluoroorganopolysiloxane, component (A).

Optional components may be added, if necessary, to the composition of the present invention as long as the effects of the present invention are not damaged. The optional components are exemplified by another inorganic conductive material such as titanium dioxide and metalic nickel powder; extenders such as silicone rubber powder and calcium carbonate; dispersing aids such as a low molecular weight-siloxane with a polymerization degree of 100 or less containing silanol groups, silanol group-containing silanes and alkoxyl group-containing silanes; and so forth. Preferably, a methyltrifluoropropylpolysiloxane having a polymerization degree of 3 to 90 blocked with hydroxyl groups at both terminal ends, that is, a compound represented by the formula:

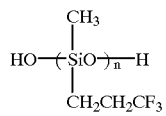

wherein n is 3 to 90, is added in an amount of 0.1 to 10 parts by weight based on 100 parts by weight of component (A).

Various additives, for example, colorants, dyes and a heat resistance improver such as cerium oxide and titanium oxide, a reaction retarder, a release agent; and so forth may also be optionally added.

In order to render flame retardance and fire resistance to the conductive fluorosilicone rubber composition of the present invention, may be optionally mixed additives conventionally used for silicone rubber compositions, such as a platinum-containing material, a combination of a platinum compound and titanium oxide, a combination of platinum and manganese carbonate, a combination of platinum and $\gamma$-$Fe_2O_3$, ferrite, mica, glass fibers, and glass flakes, as long as the effects of the present invention are not damaged.

The silicone rubber composition according to the present invention can be obtained by uniformly mixing the components as mentioned above by means of a rubber material kneading machine such as a two-roll mill, a Banbury mixer or a dough mixer (kneader), optionally followed by heat treatment. In this case, the composition may be prepared by, for example, previously mixing the organopolysiloxane of component (A), a finely divided silica filler optionally used, and so forth to prepare a base compound, mixing the graphitization-treated carbon black of component (B) with the base compound by means of a rubber material kneading machine in the same manner as above, and then adding the curing agent of component (C) to the resulting mixture.

The conductive fluorosilicone rubber composition thus obtained can be molded by various molding processes conventionally used for molding silicones, such as press molding, in accordance with an intended use. Molding conditions are not particularly limited, but molding is preferably carried out at 100 to 400° C. for 5 seconds to 1 hour. Where secondary curing is carried out after molding, it is preferably carried out at 150 to 250° C. for 1 to 30 hours.

[Utility]

The composition can be broadly used at all sites requiring conductivity, such as static electricity, removal of electricity, shield of electromagnetic waves, rubber packings, oil seals, rubber contacts, rolls for business machines.

EXAMPLES

The present invention will be described below in more detail by giving Examples and Comparative Examples. The present invention is not limited to the following Examples. In the following, "part(s)" means "part(s) by weight".

Example 1

As the fluoroorganopolysiloxane of component (A), 100 parts of a polymer represented by the following average molecular formula (2):

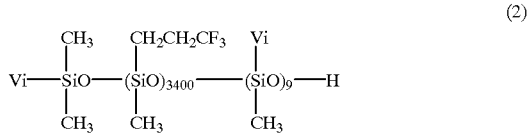

wherein Vi represents a vinyl group; as a dispersant, 2 parts of diphenylsilanediol; 8 parts of methyl-3,3,3-trifluoropropylpolysiloxane having silanol groups at both terminal ends (average polymerization degree: 20); 30 parts of fumed silica having a specific surface area of 200 $m^2/g$ (product by Nippon Aerosil K.K., tradename: Aerosil 200) were kneaded by means of a kneader and heat-treated at 150° C. for 4 hours to previously prepare base polymer A.

Next, 0.8 part of cerium dioxide and 15 parts of #4350B (product by Mitsubishi Kagaku K.K.) as a carbon black which was graphitization-treated to acquire conductivity were sufficiently mixed with 100 parts of the base polymer A above by means of a press kneader, followed by filtering through a 200 mesh screen to produce a compound.

0.5 part of 2,5-dimethyl-2,5-di(t-butylperoxy)hexane as a curing agent was kneaded with 100 parts of the above compound to produce another compound. Using the compound thus obtained, a test sheet (thickness: 2 mm) was made by press molding. The molding was carried out at 165° C., at a pressure of 35 $kgf/cm^2$.

A press-cured sheet obtained by subjecting the test sheet to press-curing only and a post-cured sheet obtained by subjecting the test sheet to press curing and then to post-curing at 200° C. for 4 hours were measured for physical properties shown in Table 1. The physical properties obtained were compared. The measuring methods were in accordance with JIS K6301. Hardness was measured by a spring type hardness tester type A defined in this standard (JIS A).

Tension set was measured as a deformation rate (%) after a sheet having a thickness of 2 mm and a length of 50 mm was extended to 200% at 25° C. for 5 minutes and then left to stand for 10 minutes.

As an indication of heat resistance, there was shown a numerical value obtained by dividing the tensile strength (abbreviated to "Post Ts") of the post-cured sheet by the tensile strength (abbreviated to "Press Ts") of the press-cured sheet, that is, Post Ts/Press Ts. The closer to 1 the numerical value, the more excellent the heat resistance. The measurement of the volume resistivity was carried out by the method of SRIS2301.

Example 2

A rubber sheet was obtained in the same manner as in Example 1, except that 15 parts of #4000B (product by Mitsubishi Kagaku K.K.) was used in place of 15 parts of #4350B as the graphitization-treated carbon black.

Comparative Example 1

In order to confirm lowering in physical properties due to the addition of carbon black, a rubber sheet as a blank was prepared in the same manner as in Example 1, except that the graphitization-treated carbon black was not added.

Comparative Example 2

A rubber sheet was obtained in the same manner as in Example 1, except that 10 parts of Ketjen Black EC (product by Ketjen Black International Co., Ltd.) was used in place of 15 parts of #4350B.

Comparative Example 3

A rubber sheet was obtained in the same manner as in Example 1, except that 15 parts of #4350B was substituted by 10 parts of Ketjen Black EC (product by Ketjen Black International Co., Ltd.) and the amount of 2,5-dimethyl-2,5-di(t-butylperoxy)hexane as the curing agent was increased to 0.8 part.

Comparative Example 4

A rubber sheet was obtained in the same manner as in Example 1, except that 7 parts of Ketjen Black EC (product by Ketjen Black International Co., Ltd.) was used in place of 15 parts of #4350B.

Comparative Example 5

A rubber sheet was obtained in the same manner as in Example 1, except that 15 parts of Denka Black (product by Denki Kagaku Kogyo K.K.) was used in place of 15 parts of #4350B.

Comparative Example 6

A rubber sheet was obtained in the same manner as in Example 1, except that 50 parts of SGO-5 (product by SEC), a kind of graphite obtained by burning, was used in place of 15 parts of #4350B.

Properties of the carbon black used in each of examples for imparting conductivity are shown in Table 1. Each of the rubber sheets obtained in Example 2 to Comparative Example 6 was measured for the physical properties as in the same manner in Example 1. The results are shown in Table 2.

TABLE 1

| Abbre-viated Title | | Average particle diameter (nm) | Specific surface area ($m^2/g$) | Volatile matter (%) |
|---|---|---|---|---|
| #4350B | #4350B, produced by Mitsubishi Kagaku | 40 | 44 | 0.3 |
| #4000B | #4000B, produced by Mitsubishi Kagaku | 20 | 80 | 0.3 |
| Ketjen Black EC | Ketjen Black EC, produced by Ketjen Black International | 31 | 800 | 0.6 |
| Denka Black | Denka Black, produced by Denki Kagaku Kogyo | 45 | 66 | 0.6 |
| SGO-5 | SGO-5, produced by SEC | 5000 | 11 | 0.5 |

TABLE 2

| | Example | | Comparative Example | | | | | |
|---|---|---|---|---|---|---|---|---|
| | 1 | 2 | 1 | 2 | 3 | 4 | 5 | 6 |
| Base polymer A | 100 | 100 | 100 | 100 | 100 | 100 | 100 | 100 |
| Cerium dioxide | 0.8 | 0.8 | 0.8 | 0.8 | 0.8 | 0.8 | 0.8 | 0.8 |
| Kind of carbon black | #4350B | #4000B | None | EC | EC | EC | AB | SGO-5 |
| Amount of carbon black | 15 | 15 | None | 10 | 10 | 7 | 15 | 40 |
| Amount of organic peroxide | 0.5 | 0.5 | 0.5 | 0.5 | 0.8 | 0.5 | 0.5 | 0.5 |

TABLE 2-continued

|  | Example | | Comparative Example | | | | | |
|---|---|---|---|---|---|---|---|---|
|  | 1 | 2 | 1 | 2 | 3 | 4 | 5 | 6 |
| Physical properties after press-cured | | | | | | | | |
| Hardness (JIS A) | 67 | 67 | 51 | 65 | 67 | 62 | 72 | 85 |
| Tensile strength | 61 | 64 | 99 | 58 | 60 | 78 | 74 | 44 |
| Tension set (%) | 2 | 6 | 2 | 11 | 10 | 7 | 8 | 18 |
| Volume resistivity (Ω · cm) | 7000 | 7000 | — | 4000 | 3600 | 270000 | 4800 | 2200 |
| Physical properties after post-cured | | | | | | | | |
| Hardness (JIS A) | 70 | 69 | 53 | 68 | 73 | 67 | 73 | 88 |
| Tensile strength | 58 | 54 | 97 | 42 | 45 | 56 | 57 | 22 |
| Tension set (%) | 6 | 9 | 2 | 20 | 19 | 18 | 13 | 30 |
| Volume resistivity (Ω · cm) | 1000 | 1100 | — | 120 | 82 | 7200 | 500 | 1800 |
| Post Ts/ Press Ts | 0.95 | 0.84 | 0.98 | 0.72 | 0.70 | 0.72 | 0.77 | 0.50 |

From the results given in Table 2, it is shown that the conductive fluorosilicone rubber obtained from the conductive fluorosilicone composition of the present invention is very small in the tension set of elastomer, rich in rubber elasticity and excellent in heat resistance.

As described and shown, the conductive fluorosilicone composition of the present invention can give, upon curing, a cured product having a small tension-set, a good rubber-elasticity and an excellent heat-resistance, as well as a desired conductivity and a good solvent-resistance which conventional fluorosilicone rubbers have.

What is claimed is:

1. A conductive fluorosilicone composition comprising:

(A) an organopolysiloxane having a polymerization degree of at least 100 and represented by the following average compositional formula:

$$R_a(CF_3CH_2CH_2)_b SiO_{[4-(a+b)]/2} \quad (1)$$

wherein R is an unsubstituted monovalent hydrocarbon group, a is a number ranging from 0.8 to 1.8, b is a number ranging from 0.2 to 1.2, and a and b are numbers satisfying a+b=1.95 to 2.05 and b/(a+b)=0.1 to 0.6, (B) a graphitization-treated carbon black, and (C) a curing agent.

2. The composition of claim 1, wherein the vinyl group comprises 0.01 to 2 mole % of the whole R in the formula (1).

3. The composition of claim 1, wherein the organopolysiloxane of the component (A) has a polymerization degree of 1,000 to 10,000.

4. The composition of claim 1, wherein the graphitization-treated carbon black of component (B) has an average particle diameter of 200 nm or less and has been obtained by subjecting a carbon black manufactured by a combustion process to heat-treatment at 1,500 to 4,000° C.

5. The composition of claim 1, wherein the component (B) is present in an amount of 1 to 100 parts by weight per 100 parts by weight of the component (A).

6. The composition of claim 1, wherein the graphitization-treated carbon black of component (B) contains a volatile matter in an amount of 0.6% by weight or less.

7. The composition of claim 1, wherein the curing agent of the component (C) is an organic peroxide.

8. The composition of claim 1, wherein the organopolysiloxane of the component (A) has at least two alkenyl groups, and the curing agent of the component (C) is a combination of an organohydrogenpolysiloxane and a platinum catalyst.

9. The composition of claim 1, which further comprises a compound represented by the formula:

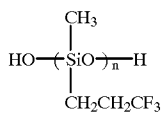

wherein n is 3 to 90, in an amount of 0.1 to 10 parts by weight based on 100 parts by weight of component (A).

* * * * *